INVENTOR.
PAUL E. ROLFES
BY
ATTORNEYS

Nov. 14, 1967  P. E. ROLFES  3,353,029
APPARATUS AND METHOD FOR EFFECTING UNIDIRECTIONAL
FLOW OF POWER IN A.C. CIRCUITS
Filed Aug. 24, 1964  2 Sheets-Sheet 2
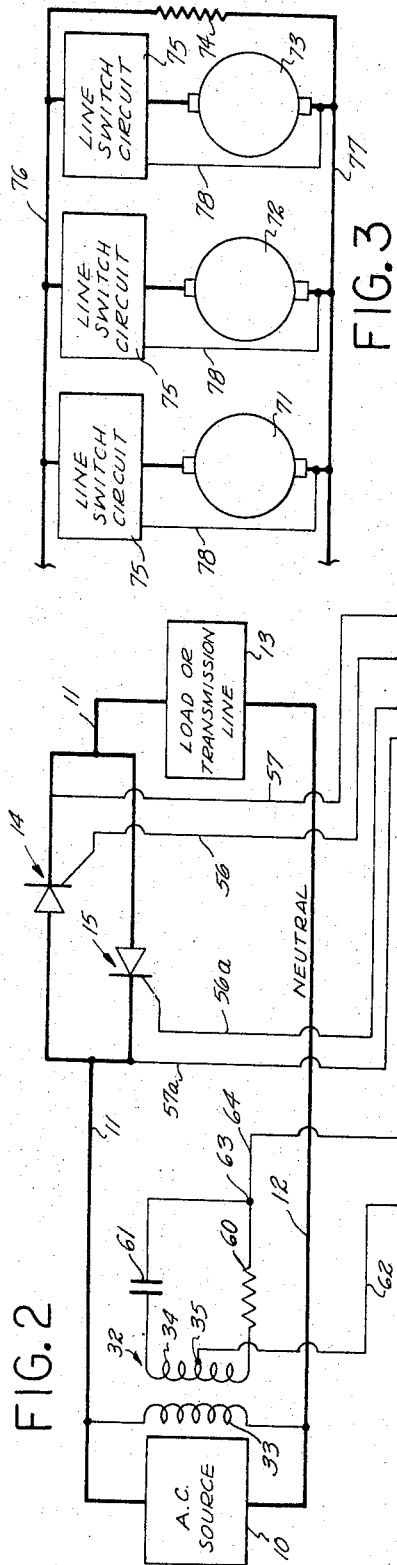
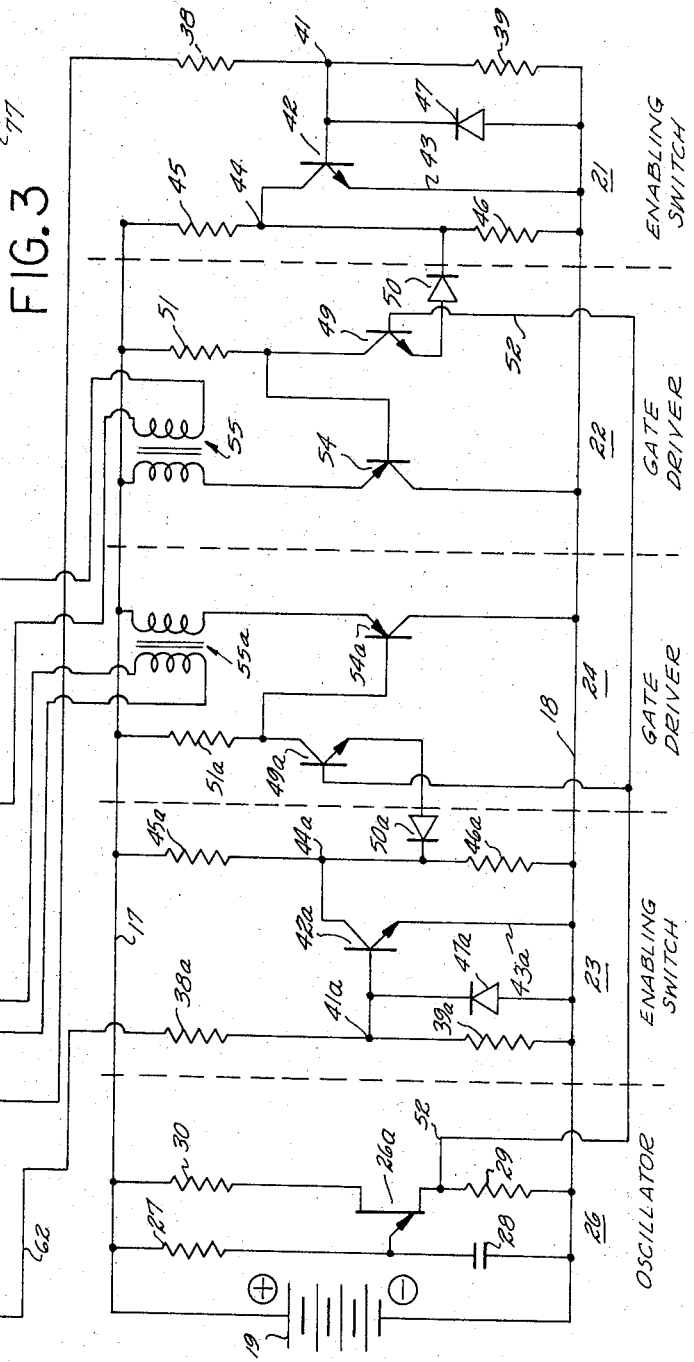
INVENTOR.
PAUL E. ROLFES
BY
ATTORNEYS

United States Patent Office 3,353,029
Patented Nov. 14, 1967

3,353,029
APPARATUS AND METHOD FOR EFFECTING UNIDIRECTIONAL FLOW OF POWER IN A.C. CIRCUITS
Paul E. Rolfes, Costa Mesa, Calif., assignor, by mesne assignments, to Lorain Products Corporation, Lorain, Ohio, a corporation of Ohio
Filed Aug. 24, 1964, Ser. No. 391,501
9 Claims. (Cl. 307—51)

ABSTRACT OF THE DISCLOSURE

Apparatus and method for preventing reverse flow of substantial power in a symmetrical A.C. system, by sensing the voltage wave present in such system, and advancing the phase of the wave which is generated as the result of such sensing operation. The phase-advanced wave is employed to maintain the main circuit closed when the phase relationship between the voltage and current waves present therein is such as to effect transfer of power in the desired direction, and to maintain such circuit open during periods when the phase relationship between the voltage and current waves is such as to effect transfer of power in the undesired direction.

---

Figure 1:
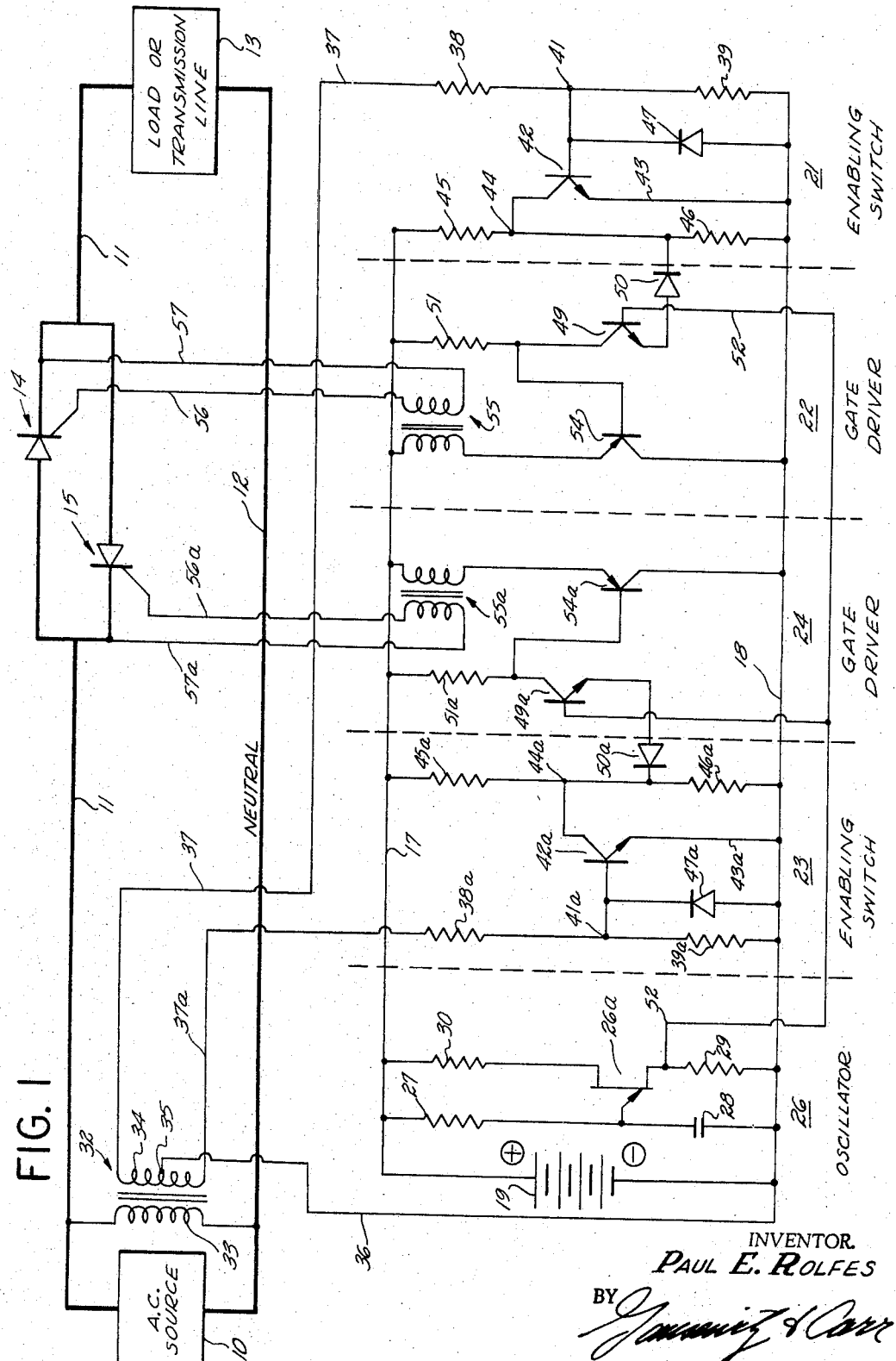

This invention relates to an apparatus and method for effecting flow of power in a predetermined direction between an A.C. power source and a load or transmission line, and for preventing power flow in the reverse direction.

It is frequently desirable, in A.C. circuits, to permit flow of power in a predetermined direction only. For example, in the case of a power transmission line supplied by a multiplicity of synchronized, parallel-connected A.C. generators (or slaved inverters, etc.) it is undesirable to permit a condiiton by which one generator drives another generator and thereby subtracts power from the line. It is to be understood that attempts are made to cause all of the multiplicity of generators to produce equal voltages, so that al power flows from the generators to the load or transmission line. In actual practice, however, one (or more) generator may produce a lower voltage than the others, such low-voltage generator acting as a load on the higher-voltage generators in the system. In such a situation it is desirable to disconnect the low-voltage generator.

In view of the above, it is one important object of the present invention to provide an apparatus and method for preventing any substantial reverse flow of power in an A.C. line, by opening a power circuit in response to each reversal or attempted reversal of the direction of power flow.

A further important object of the invention is to effect an automatic resumption of power flow, in the desired direction and when circuit conditions make it possible, without the necessity for effecting any manual resetting of switches, etc.

Another object of the invention is to provide a simple, economical and effective solid-state circuit, in the nature of an A.C. check valve or A.C. diode, for providing a substantially instantaneous control of the power-flow direction in an A.C. line.

These and other objects will become apparent from the following detailed description taken in connection with the accompanying drawings in which:

FIGURE 1 is a circuit diagram schematically illustrating one embodiment of the present invention, such embodiment being particularly adapted to be employed in connection with a load or transmission line which draws an in-phase current or a lagging current;

FIGURE 2 is a circuit diagram schematically illustrating a second embodiment of the invention, being particularly adapted to be employed in conjunction with a load or transmission line which draws a leading current; and FIGURE 3 is a diagram representing one combination incorporating the present apparatus and emthod, a plurality of line switch circuits being shown in conjunction with a plurality of parallel-connected A.C. sources supplying power to a common load.

Referring first to the embodiment of FIGURE 1, an A.C. source is schematically represented at 10, being connected through power leads 11 and 12 to a load 13. It is to be understood that the "source" 10 may comprise a generator, A.C. transmission line, inverter, etc., adapted to supply power through leads 11 and 12 to the load. The term "load" is sufficiently broad to comprehend another power source as a transmission line, or one or more generators, inverters, etc. Thus, it will be understood that the present invention relates to controlling the direction of power flow between any two points in an A.C. circuit or system, particularly a system in which there are a plurality of power sources.

It is to be remembered that the power supplied from source 10 to load 13 is equal to the product of the current, the voltage, and the cosine of the phase angle between the current and voltage waves. Thus, when the cosine of the phase angle is positive, the flow of power will be in the desired direction, namely from left to right or from source 10 to load 13. On the other hand, when the cosine is negative the direction of power flow will be from load 13 to source 10.

Stated in another manner, the power flow will be in the desired direction, namely from source 10 to load 13, when the current and voltage waves are substantially in phase with each other. On the other hand, when the current and voltage waves are substantially 180 degrees out of phase the power flow will be in the reverse or undesired direction.

Interposed in one of the leads, illustrated as number 11, are first and second controlled rectifiers disposed in reverse oriented (back-to-back), parallel relationship, the orientation being such that current flows through rectifier 14 when circulating in a clockwise direction through leads 11 and 12, and through rectifier 15 when circulating in a counterclockwise direction. The controlled rectifiers 14 and 15 are preferably SCR's, but may comprise certain analogous elements.

There will next be described a simple, economical and effective solid-state circuit for controlling the SCR's 14 and 15 in such manner that any reversal in power flow (opposite to the deirsed left-to-right direction) only continues for an exceedingly brief time period, such as the twenty-five microsecond (approximately) period required to clear either SCR of current carriers.

The circuit for controlling the gates of SCR's 14 and 15, in order to achieve the above-specified results, includes first and second D.C. leads 17 and 18, respectively, which are supplied with power from a battery or D.C. power supply 19. An enabling switch 21 and associated gate driver 22 are connected to the leads 17 and 18 and are adapted to control the first SCR 14. A second enabling switch 23 and gate driver 24 (which correspond, respectively, to the circuits 21 and 22) effect control of the second SCR 15.

An oscillator 26 is adapted in conjunction with the various circuits 21–24 to supply pulse trains to the gate of one of the SCR's 14 and 15 at desired times, and to the gate of the other SCR at other desired times. As set forth in detail in co-pending patent application Ser. No. 338,748, filed Jan. 20, 1964, for an Apparatus and Method for Starting, Operating and Stopping an Inverter, inventor Robert S. Jamieson, each pulse supplied to an SCR 14 or 15 has a magnitude and duration sufficient to effect triggering thereof. The oscillator 26 preferably comprises a unijunction transistor relaxation oscillator of the type described on page 194 of the General Electric Transistor Manual, Sixth Edition. In such an oscillator, the emitter of the unijunction transistor 26a is connected to the junction between a resistor 27 and capacitor 28 which are series connected across leads 17 and 18. Base-one of the transistor is connected through a resistor 29 to lead 18, whereas base-two is connected through a resistor 30 to lead 17.

Means are provided to sense the phase and magnitude of the voltage wave present across leads 11 and 12, and to employ such voltage wave to control the enabling switches 21 and 23 and associated circuitry. The illustrated means is a sensing transformer 32 having a primary 33 connected across leads 11 and 12. The secondary 34 of the sensing transformer is provided with a center tap 35 which, in the embodiment of FIGURE 1, is connected through a lead 36 to negative lead 18. The upper terminal of transformer secondary 34 is connected through a lead 37 and first and second series-related resistors 38 and 39 to negative lead 18, such resistors forming part of the enabling switch 21 for SCR 14.

The junction 41 between resistors 38 and 39 is connected to the base of an NPN transistor 42 the emitter of which is connected through a lead 43 to negative lead 18. The collector of transistor 42 is connected to the junction 44 between series-related resistors 45 and 46, the former of which connects to lead 17 and the latter to lead 18.

The remaining component of enabling switch 21 comprises a diode 47 the anode of which is connected to negative lead 18 and the cathode of which is connected to the base of transistor 42.

Let it be assumed, for example, that the voltage at the upper terminal of A.C. source 10 is positive, so that the voltage at the upper terminal of transformer secondary 34 is also positive. Current will then flow to the right through the lead 37 and downwardly through resistors 38 and 39 to negative lead 18, thence back through lead 36 to the center tap 35 of the transformer secondary. Because no current flows through the diode 47, which is then reverse biased, there is a very substantial voltage drop across the resistor 39, causing the voltage at junction 41 to be highly positive relative to the voltage at negative lead 18. The voltage at the base of transistor 42 is therefore highly positive relative to the voltage at the emitter thereof, causing transistor 42 to be in saturated condition.

Because the transistor 42 is thus in saturated condition, or at least in conduction, the voltage at junction 44 is reduced to substantially the voltage of negative lead 18. Such reduction in the voltage at junction 44, relative to the normal voltage thereat caused by the voltage-divider action of resistors 45 and 46, places in conduction a second NPN transistor 49 which forms part of gate driver circuit 22.

The emitter of transistor 49 is connected to the anode of a diode 50, the cathode of such diode being connected to junction 44 in enabling switch 21. The collector of transistor 49 is connected through a load resistor 51 to positive lead 17, whereas the base of transistor 49 is connected through a lead 52 to the output of oscillator 26.

The remaining components of the gate driver circuit 22 comprise a PNP transistor 54 which is connected in emitter-follower relationship, the load being the primary of a pulse transformer 55. Stated more definitely, the emitter of transistor 54 is connected through the transformer primary to lead 17, whereas the collector of the transistor is connected to lead 18. The base of transistor 54 is connected to the junction between load resistor 51 and the collector of transistor 49.

The secondary of pulse transformer 55 is connected through leads 56 and 57 to the gate and cathode of SCR 14, so that such SCR will be triggered when a pulse train is supplied to the primary of transformer 55 in response to operation of transistors 49 and 54.

The values of resistors 45 and 46, the voltage supplied by battery 19, the output voltage from oscillator 26, and other factors, are so related that transistor 49 is continuously in cut-off condition except during periods when transistor 42 is in conduction. Stated otherwise, such values are so related that transistor 49 will not pass the pulse train generated by oscillator 26, except during periods when transistor 42 is in conduction.

Prior to the time when transistor 42 conducts, the positive voltage at junction 44 is transmitted through diode 50 to the emitter of transistor 49, causing such emitter voltage to be highly positive with respect to the positive pulses delivered to the transistor base from oscillator 26, so that the transistor is ineffective to pass such pulses. However, as soon as transistor 42 conducts (in response to the presence of positive voltages at the upper terminal of A.C. source 10 and at the upper end of sensing transformer secondary 34, as previously stated), the voltage at junction 44 is reduced to substantially that of lead 18, so that transistor 49 is no longer cut off. The positive pulses from oscillator 26 then cause transistor 49 to conduct during the continuance of each pulse, the circuit being from lead 17 through resistor 51, transistor 49, diode 50, junction 44, and the then-conducting transistor 42 through lead 43 to negative lead 18.

Amplified voltage pulses thus appear in the collector load resistor 51 and are supplied to the emitter-follower transistor 54, so that the transformer 55 causes a pulse train to pass through leads 56 and 57 and trigger the SCR 14. Current is thus permitted to flow in the clockwise direction from source 10 to load 13 when the upper terminal of source 10 is positive, which means that the voltage and current waves are then substantially in phase with each other so that the direction of power flow is from source 10 to load 13 as desired.

As will be described hereinafter, SCR 15 is not then in conduction. If, therefore, the current should attempt to reverse suddenly (prior to the end of the half-cycle) and flow through lead 11 from load 13 to source 10, SCR 14 will be commutated to off condition as soon as its junctions are swept free of current carriers (approximately twenty-five microseconds, as previously stated). Therefore, and because the SCR 15 is not then in conduction, the switch formed by SCR's 14-15 will be open, and all flow of power will be terminated. However, as soon as the voltage and current conditions are again such that the direction of power flow is from source 10 to load 13, the flow of power will be resumed as soon as the appropriate SCR is triggered in response to operation of sensing transformer 32, and circuits 21-24.

The following are examples of various component valves, etc., which may be employed. Such values are stated for purposes of illustration only, not limitation. Resistor 38 may have a value of 10 kilohms, resistor 39 a value of 51 kilohms, resistor 45 a value of 1.8 kilohms, resistor 46 a value of 2.7 kilohms, and resistor 51 a value of 1 kilohm. Thus, because of the relatively high value of resistor 39, it will be seen that the voltage developed at junction 41 is substantial. Because of the relative values of resistors 45 and 46, which form a voltage divider, the voltage at junction 44 varies between approximately 14 volts and approximately 0 volts, this assuming that the battery 19 supplies about 21 volts. The positive pulses supplied by oscillator 26 may have peak magnitudes on the order of 3 or 4 volts.

Transistor 42 may be a 2N2712 silicon transistor, thereby eliminating any necessity for diode and resistor elements for purposes such as heat compensation.

As previously indicated, the enabling switch 23 and gate driver 24 for the second SCR, number 15, are identical to the circuits 21 and 22, respectively. The elements in circuits 23-24 have therefore been numbered correspondingly to the elements in circuits 21-22, except that each reference numeral is followed by the letter "a." Thus, the entire system is symmetrical, as are the voltage and current waves present in the A.C. lines 11 and 12.

The pulse transformer 55a of gate driver circuit 24 is connected to trigger the SCR 15, which permits current flow in a counterclockwise direction through the power circuit. The resistor 38a is connected through lead 37a to the lower end of the secondary 34 of sensing transformer 32.

Because lead 37a is connected to the lower end of transformer secondary 34, whereas lead 37 is connected to the upper end thereof, lead 37a will be negative during the above-indicated period when lead 37 is positive. When lead 37a is negative, current flows from center tap 35 through lead 36, a portion of lead 18, diode 47a, resistor 38a and lead 37a back to the lower end of secondary 34. Thus, the resistor 39a is substantially bypassed by diode 47a, very little voltage being developed across the resistor 39a. The slight voltage thus developed is effective to maintain transistor 42a in cut-off condition, so that the enabling switch 23 is not actuated and, accordingly, no trigger voltage is supplied to the gate of SCR 15. From the above it will be understood that diode 47a limits the reverse bias impressed on transistor 42a.

During the same time interval as that described in the previous paragraph, the downward flow of current from the upper end of transformer secondary 34 through lead 37 and resistors 38–39 is operative, as described above in detail, to cause transistor 42 to conduct and thus operate enabling switch 21 to effect supply of trigger signal to SCR 14.

During the next subsequent half-cycle of the voltage wave present in power leads 11 and 12, the voltage at the upper terminal of source 10 is negative and that at the lower terminal thereof is positive. It follows that current will flow downwardly through lead 37a and resistors 38a and 39a, developing a voltage across resistor 39a to cause transistor 42a to conduct. During this same time interval, current flows downwardly through lead 36 to lead 18, thence upwardly through diode 47 and resistor 38 to lead 37. Therefore, as previously described relative to transistor 42a, transistor 42 is maintained in cut-off condition. It will thus be observed that the enabling switches 21 and 23 conduct alternately, much in the manner of push-pull overdriven amplifiers.

*Summary of operation, embodiment of FIGURE 1*

Let it be assumed that the voltage at the upper terminal of source 10 is positive and that conditions in the "load" 13 (which, as stated above, is normally a second power source) are such that current is attempting to flow in a clockwise direction through power leads 11 and 12 between the source and the load. A positive voltage is then developed at the upper end of the secondary 34 of transformer 32, effecting downward flow of current through resistors 38 and 39 so that a substantial positive voltage is present at junction 41. Transistor 42 is thus caused to conduct, which reduces the voltage at junction 44 to a value sufficiently low to permit transistor 49 to pass the triggering pulse train generated by oscillator 26. Such pulse train is transmitted through the emitter-follower transistor 54 and pulse transformer 55 to the gate of SCR 14, causing such SCR to be in conduction. Current thus flows in the clockwise direction, as desired.

During the same period of time, current delivered through lead 36 and negative lead 18 from the center tap 35 of transformer secondary 34 is bypassed through diode 47a, the polarity being such that transistor 42a is maintained in cut-off condition. Accordingly, no triggering pulse train is delivered to SCR 15.

If the conditions in load or transmission line 13 become such that, while SCR 14 is conducting (and despite the fact that the voltage at the upper terminal of source 10 remains positive), current attempts to flow to the left through lead 11, SCR 14 will be substantially immediately commutated to off condition. Because SCR 14 is thus commutated to off condition, and because SCR 15 is not in conduction, the power circuit will be broken and the source 10 will therefore not be operative to drain power from the load or transmission line 13.

During the next half-cycle of the voltage wave from source 10, when the upper terminal of such source is negative, the various voltages reverse in such manner that SCR 15 is caused to conduct wehreas SCR 14 is in off condition. Any attempted current reversal during such half-cycle will therefore commutate SCR 15 to off condition, again breaking the circuit because, during such interval, SCR 14 is not in conduction.

Should the voltage generated by source 10 reduce to zero (or to a very low value), for example due to a failure or breakdown of such source, there will no longer be sufficient voltage across resistors 46 and 46a to trigger the SCR's 14 and 15. It follows that the line switch formed by SCR's 14 and 15 will remain open as desired.

Should the source 10 remain sufficiently operative to effect triggering of SCR's 14 and 15, during a period when power attempts to pass from load 13 to source 10, such triggering will nevertheless have no effect, and no power will flow in the reverse direction. This is because SCR 14 will be triggered when it is reverse biased, the current attempting to flow from the load to the source, so that such triggering is inoperative to result in current flow. Similarly, SCR 15 will be triggered when it is reverse biased.

It is pointed out that the second power source, which forms the "load" 13, is normally a source producing a voltage wave having the same frequency, and substantially the same magnitude, as the wave produced by source 10. Such second source is normally so connected that the upper terminal thereof is positive when the upper terminal of source 10 is positive, whereas the lower terminal is negative when the lower terminal of source 10 is negative. Thus, the sources 10 and 13 are in bucking relationship relative to each other, although both normally supply power to a common load. Such a system is illustrated in FIGURE 3, to be described hereinafter, if one of the generators 71–73 is regarded as a "load" on another generator. The present system prevents power transfer when the "load" source 13 dominates source 10, but permits power transfer when source 13 is dominated by source 10.

The present apparatus and method eliminate any requirement for relays, etc., or any means for withholding gate signals at any time. Instead, the gate signals to the SCR's may be supplied continuously, but the timed relationship of the gate signals relative to at least one of the voltage and current waves is such that power flow is substantially unidirectional. The present circuit therefore operates in a simple manner, and with great speed and reliability.

*Embodiment of FIGURE 2*

The circuit described relative to FIGURE 1 operates particularly well with loads which draw in-phase currents, and for loads which draw lagging currents. In the latter case, each SCR will not commence to conduct immediately upon receiving gate signal, the current having not yet reversed. However, as soon as the current attempts to reverse, the next subsequent triggering pulse will cause flow of current through the SCR.

For example, let it again be assumed that the upper terminal of source 10 is positive so that triggering signal is supplied to the gate of SCR 14 as described above. However, because the load current is lagging, such current will still be flowing in the counterclockwise direction through SCR 15, it being understood that such SCR 15 will continue to conduct so long as current flows therethrough in the forward direction, regardless of whether or not the trigger signal is continued. Upon reversal of the current, so that it attempts to flow in a clockwise direction, such clockwise flow of current is permitted as soon as the next-subsequent triggering pulse is supplied from the gate driver circuit 22 to SCR 14. Such trigger pulses are, as described in the above-cited co-pending patent application, relatively high-frequency in nature so that very little time is lost between pulses. Furthermore, it is to be understood that various other triggering signals may be applied, for example a square-wave signal which continues for the full half-cycle.

The phase of the trigger signals may be adjusted correspondingly to the phase angle between the voltage wave and the lagging current wave, in such manner that the duration of any reverse-direction power flow is minimized. Such a system will next be described, but relative to a leading-current condition as distinguished from a lagging-current condition, it being understood that similar phase-shift principles apply to leading and lagging currents.

When the current drawn by the load or transmission line 13 is leading in nature, the proper SCR must be triggered before the associated source terminal becomes positive. This may be accomplished by means of a bridge-type phase-shifting network as shown in FIGURE 2 such network consisting of a resistor 60 which is connected to the lower terminal of transformer secondary 34, and a capacitor 61 which is connected to the upper terminal thereof. It is emphasized that the center tap 35 on transformer secondary 34 is not connected to negative lead 18, being instead connected through a lead 62 to the upper end of resistor 38a. The terminals of resistor 60 and capacitor 61 which are remote from the transformer secondary are connected together at a junction 63 which, in turn, is connected through a lead 64 to the upper terminal of resistor 38.

From the above it will be observed that leads 36, 37 and 37a of the previous embodiment have been replaced by different leads 62 and 64. Such a manner of connection relates the two enabling switches 21 and 23 in a single circuit with the secondary 34 of transformer 32.

The values of resistor 60 and capacitor 61 are so selected that the phase shift effected thereby effects triggering of the associated SCR's at the desired times. For example, resistor 60 may have a value of 4.7 kilohms, whereas capacitor 61 may have a value of 1 microfarad. By appropriately selecting the value of capacitor 61, and the related resistor 60, the voltage at junction 63 may be made to lead the voltage across power leads 11 and 12 (and across the transformer secondary) by any desired amount, up to 180 degrees. The degree of phase shift effected by the network 60-61 is caused to be at least equal to the degree by which the current flowing through the load 13 leads the voltage wave across leads 11 and 12, so that the appropriate SCR will be triggered as soon as current attempts to flow therethrough in the desired direction.

Let it be assumed, for example, that the current flowing in leads 11 and 12 leads the voltage wave thereacross by a phase angle of 40 degrees. Let it also be assumed that the phase shift effected by elements 60-61 is on the order of 50 degrees, so that the current flowing through junction 63 leads the voltage wave present across transformer secondary 34 by approximately 50 degrees. Because of these relationships, current will attempt to flow clockwise through leads 11 and 12 approximately 40 degrees before the voltage at the upper terminal of source 10 becomes positive. Furthermore, and ignoring any phase shift in transformer 32, current will pass downwardly from junction 63 through lead 64 to resistors 38 and 39 approximately 50 degrees before the voltage at the upper terminal of source 10 becomes positive. Therefore, and because the downward flow of current from junction 63 builds up a voltage in resistor 39 which is operative to effect triggering of SCR 14, such SCR will be triggered to operative condition approximately 10 degrees before current attempts to flow clockwise through leads 11 and 12 and load 13. Conversely, the SCR 15 is triggered before the current attempts to flow in a counterclockwise direction through leads 11 and 12 and load 13.

It is pointed out that the flow of current from junction 63 through lead 64 and downwardly through resistors 38 and 39 is in a circuit which includes negative lead 18, diode 47a, resistor 38a, and center tap 35 on transformer secondary 34. Such upward flow of current through diode 47a maintains transistor 42a in cut-off condition, as previously described, so that the SCR 15 is not triggered at this time. In the indicated manner, therefore, the two enabling switches 21 and 23 are tied together in the same series circuit.

The degree of phase shift effected by elements 60-61 is, in accordance with one feature of the invention, matched (by adjusting the value of resistor 60) relative to the leading nature of the current flow through load 13, so that the SCR 14 will be triggered only slightly before current attempts to flow clockwise through leads 11 and 12. Thus, for example, the 10-degree difference stated in the above illustration may be reduced to 1 degree, or a fraction thereof. Conversely, relative to a load 13 drawing lagging currents as indicated above, a phase-shift network may be introduced to adjust the trigger pulse train in such manner that triggering of an SCR is not effected until a very short time period before current attempts to flow therethrough. Such matching is beneficial (as noted above) since it reduces to a minimum the time during which power may flow in a direction from load 13 to source 10.

*Embodiment of FIGURE 3*

Referring next to FIGURE 3, an arrangement is schematically illustrated by which a plurality of A.C. generators 71–73 are connected in parallel-circuit relationship to supply power to a load which is indicated at 74. The generators are driven in sync with each other, and in in-phase relationship relative to each other, being intended to supply equal voltages to the output terminals whereby all of the generators supply the load 74. However, as indicated heretofore, it frequently occurs that the output voltage generated by a particular one of the generators is less than that supplied by one or more of the others, so that such low-voltage generator becomes a load on the others and thereby subtracts power from the load 74.

In order to prevent such loss of power to the load, and also to prevent an even more serious condition by which one of the generators breaks down and thereby draws a large amount of current from the other generators, a line switch 75 is connected in series with each of the generators 71–73. Stated otherwise, the series combination of a line switch circuit 75 and a generator 71–73 is connected across the mains or leads 76 and 77 which supply power to load 74.

Each of the line switch circuits 75 corresponds to the circuitry shown in FIGURE 1, including the sensing transformer 32, the SCR's 14 and 15, and the various circuits 21–24 and 26. In order to permit each line switch circuit 75 to sense the voltage across the associated generator 71, 72 or 73, a lead 78 is extended from the line switch circuit to the opposite side of the connected generator.

When the voltage delivered by each of the generators 71–73 is equal to that delivered by each of the others, all of the generators are operative to supply power to load 74, that is to say in a direction from left to right. Let it be assumed, however, that generator 71 is operating improperly in such manner that it delivers to the leads 76–77 a voltage which is substantially lower than that delivered thereto by generators 72 and 73. When such a condition occurs, the generators 72 and 73 supply load 74, and also supply current which flows through generator 71. The last-mentioned current constitutes a drain on generators 72 and 73, and represents power which is subtracted from that delivered to load 74.

In accordance with the present invention, such reverse flow of power to generator 71 only continues for an extremely short time period, until the line switch circuit 75 connected to the generator 71 operates to open the circuit thereto. Upon resumption of the normal condition by which the generator 71 again supplies to leads 76 and 77 a voltage equal to that supplied by generators 72 and 73, so that current attempts to flow to load 74 from the generator 71, the line switch circuit 75 closes and permits such desired flow of power.

In the described manner, therefore, the total output of power from generators 71–73 to load 74 is rendered substantially greater, despite various adverse conditions which may occur during operation of the generators, than in situations wherein no line switch circuits 75 are employed.

An important application of the present invention is in line controls for standby power supply systems. Thus, the present circuit may be incorporated in the line control described in copending patent application Ser. No. 352,103, filed Mar. 16, 1964, for Line Control for A.C. Power Lines, Inventors Robert S. Jamieson and Paul E. Rolfes.

The foregoing detailed description is to be clearly understood as given by way of illustration and example only, the spirit and scope of this invention being limited solely by the appended claims.

I claim:

1. An A.C. circuit incorporating control means for the direction of power flow, which circuit comprises:
   a first A.C. source providing an A.C. voltage wave,
   a second A.C. source having the same frequency as said first source,
   electric-circuit means connecting said sources in bucking relationship,
   first and second controlled rectifiers interposed in said circuit means in reverse-oriented parallel relationship,
   control means to supply a trigger signal to said first rectifier during alternate portions of said A.C. voltage wave from said first source when the phase relationship between said voltage wave and the current then present in said circuit means in such that power passes from said first source to said second source, and
   control means to supply a trigger signal to said second rectifier during remaining alternate portions of said A.C. voltage wave from said first source when the phase relationship between said voltage wave and the current then present in said circuit means is such that power passes from said first source to said second source,
   each of said control means comprising an oscillator and further comprising a constant voltage D.C. source to supply power to said oscillator, whereby the trigger signals supplied to said rectifiers are independent of voltage fluctuations in said A.C. sources.

2. A method of preventing reverse flow of substantial power in a symmetrical A.C. system, which comprises:
   providing switch means between first and second predetermined points in a symmetrical A.C. system,
   determining the phase relationship between the voltage and current waves in said system which is required ot effect transfer of power from said first point to said second point,
   continuously sensing at least one of said voltage and current waves,
   advancing the phase of the wave which is generated as the result of such sensing step, employing the phase-advanced wave to maintain said switch means closed when said phase relationship is such as to effect transfer of power from said first point to said second point, and
   employing the phase-advanced wave to maintain said switch means open during at least the major portion of the time when said phase relationship is such as to effect transfer of power from said second point to said first point.

3. A method of preventing reverse flow of substantial power in an A.C. system wherein symmetrical A.C. voltage and current waves are present, which comprises:
   connecting two controlled rectifiers in reverse-oriented parallel relationship between first and second points in said system,
   sensing the voltage wave present in said system between said first point and said rectifiers,
   and advancing the phase of the voltage wave which is generated as the result of such sensing step,
   employing said phase-advanced voltage wave to effect supply of a trigger signal to one of said rectifiers during alternate half cycles when the phase relationship between the voltage and current waves in said system is such that power flows from said first point to said second point,
   discontinuing said trigger signal to said one rectifier during at least major portions of the remaining alternate half cycles,
   employing said phase-advanced voltage wave to effect supply of a trigger signal to the other of said rectifiers during said remaining alternate half cycles when the phase relationship between the voltage and current waves in said system is such that power flows from said first point to said second point, and
   discontinuing said trigger signal to said other rectifier during at least major portions of said first-mentioned alternate half cycles,
   whereby reversal of the direction of current flow through the triggered rectifier will commutate the same to off condition, thereby operating in conjunction wtih the non-triggered rectifier to open the circuit between said first and second points when power attempts to flow from said second point to said first point, and whereby said trigger signals are effective to cause full transfer of power from said first point to said second point regardless of the resistive, capacitive or inductive nature of the load.

4. In combination with a symmetrical A.C. power circuit including an A.C. source, a load, and leads connecting said source to said load, circuitry for preventing transfer of substantial power from said load to said source, said circuitry comprising:
   first and second controlled rectifiers connected in one of said leads in reverse-oriented parallel relationship,
   oscillator means to generate triggering signals adapted to effect triggering of said rectifiers,
   sensing means to generate a voltage wave determined by the voltage wave supplied by said source,
   a first enabling switch responsive to the voltage generated by said sensing means to effect supply of triggering signal from said oscillator means to said first rectifier during alternate half cycles of the voltage wave supplied by said source,
   a second enabling switch responsive to the voltage generated by said sensing means to effect supply of triggering signal from said oscillator means to said second rectifier during the remaining alternate half cycles of the voltage wave supplied by said source, and
   means to advance the phase of said triggering signals relative to the phase of said voltage wave sensed by said sensing means,
      said sensing means and enabling switches being correlated to each other, to said source, and to said load in such manner that said rectifiers pass current during periods when power will pass therethrough from said source to said load, and do not pass substantial current during periods when power attempts to pass therethrough from said load to said source.

5. A power and control circuit, which comprises:
   first and second power leads adapted to supply power from an A.C. source to a load,
   first and second SCR's interposed in one of said leads in reverse-oriented parallel relationship,
   a sensing transformer connected across said first and second leads at points between said SCR's and said source,
   a battery-powered oscillator to generate trigger signal, first and second enabling switches associated with said oscillator to control the output thereof,
   each of said enabling switches including a transistor the condition of which is adapted to be changed in response to the voltage across a resistor,
      said resistor of each of said enabling switches being connected to said transformer in such manner that said transistors are alternately in conduction and cut off, and
   circuit means responsive to the condition of said transistors to effect alternate triggering of said SCR's by said trigger signal,
      said transformer and said SCR's being so correlated to each other and to the remaining elements of said circuit that said SCR's are substantially inoperative to pass current during periods when power attempts to pass therethrough from said load to said source.

6. The invention as claimed in claim 5, in which gate driver circuits including emitter-follower stages are provided between said enabling switches and said SCR's.

7. The invention as claimed in claim 5, in which a phase-shift bridge comprising a resistor and capacitor is connected to the secondary of said sensing transformer, the terminals of said resistor and capacitor remote from said secondary being connected to a junction which, in turn, is connected to said resistor of one of said enabling switches, and in which said transformer secondary is provided with a center tap which is connected to said resistor of the other of said enabling switches.

8. An A.C. circuit incorporating control means for the direction of power flow, which circuit comprises:
   a first single-phase A.C. source providing an A.C. voltage wave,
   a second single-phase A.C. source having the same frequency as said first source,
   a first lead connecting a terminal of said first source with a terminal of said second source,
   a second lead connecting the remaining terminal of said first source with the remaining terminal of said second source,
      said leads and terminals being so related that said first and second sources are substantially in bucking relationship relative to each other,
   first and second controlled rectifiers interposed in said first lead in reverse-oriented parallel relationship,
      said first controlled rectifier being oriented to permit flow of current in a direction from said first source to said second source through said first lead, said second controlled rectifier being oriented to permit flow of current in a direction from said second source to said first source through said first lead,
   first control means to supply trigger signal to said first rectifier during alternate portions of the A.C. voltage wave generated by said first source,
      said first control means withholding trigger signal from said first rectifier during the remaining portions of said A.C. voltage wave generated by said first source,
      said first control means supplying said trigger signal to said first rectifier during alternate wave portions when the terminal of said first source to which said first lead is connected is of positive polarity,
   second control means to supply trigger signal to said second rectifier during said remaining portions of said A.C. voltage wave generated by said first source,
      said second control means withholding trigger signal from said second rectifier during said alternate portions of said A.C. voltage wave from said first source,
      said second control means supplying said trigger signal to said second rectifier when the terminal of said first source to which said first lead is connected is of negative polarity,
      whereby said rectifiers operate to effect transfer of power from said first source to said second source, but to prevent substantial transfer of power from said second source to said first source.

9. A method of preventing reverse flow of substantial amounts of power in a symmetrical A.C. system wherein first and second A.C. sources, each generating the same frequency, are connected by a line, which comprises:
   providing reverse-oriented parallel-connected controlled rectifiers in said line to thereby act as a switch controlling transfer of power between said first and second A.C. sources,
   sensing the voltage wave present in said line between said first A.C. source and said parallel-connected controlled rectifiers,
   employing the voltage wave thus sensed to regulate the supply of trigger signals to said rectifiers in such manner as to maintain said controlled rectifiers in circuit-closing conditions when the phase relationship between the voltage wave and the current wave present in said line is such as to effect transfer of power from said first A.C. source to said second A.C. source,
   employing the voltage wave thus sensed to regulate the supply of trigger signals to said rectifiers in such manner as to maintain said controlled rectifiers in circuit-opening conditions when the phase relationship between the voltage wave and the current wave present in said line is such as to effect transfer of substantial power from said second A.C. source to said first A.C. source, and
   advancing the phases of the trigger signals supplied to said controlled rectifiers relative to the phase of the voltage wave thus sensed in order to condition said rectifiers to effect unidirectional power transfer from said first A.C. source to said second A.C. source regardless of the capacitive, inductive or resistive nature of a load associated with said line.

References Cited
UNITED STATES PATENTS

| | | | |
|---|---|---|---|
| 3,229,111 | 1/1966 | Schumacher | 307—66 |
| 3,183,312 | 5/1965 | Chin | 307—88.5 |
| 3,095,534 | 6/1963 | Cockrell | 321—19 |
| 2,883,561 | 4/1959 | Reeder | 307—87 XR |

ORIS L. RADER, *Primary Examiner.*

T. J. MADDEN, *Assistant Examiner.*